(12) United States Patent
Gao et al.

(10) Patent No.: US 10,627,683 B2
(45) Date of Patent: Apr. 21, 2020

(54) DISPLAY PANEL AND DISPLAY DEVICE

(71) Applicant: SHANGHAI TIANMA AM-OLED CO., LTD., Shanghai (CN)

(72) Inventors: Yana Gao, Shanghai (CN); Yue Li, Shanghai (CN); Renyuan Zhu, Shanghai (CN); Dongxu Xiang, Shanghai (CN); Xingyao Zhou, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 0 days.

(21) Appl. No.: 15/862,607

(22) Filed: Jan. 4, 2018

(65) Prior Publication Data

US 2018/0129106 A1 May 10, 2018

(30) Foreign Application Priority Data

Sep. 11, 2017 (CN) .......................... 2017 1 0812736

(51) Int. Cl.
*G02F 1/1343* (2006.01)
*G02F 1/1345* (2006.01)
(Continued)

(52) U.S. Cl.
CPC .... *G02F 1/134363* (2013.01); *G02F 1/13452* (2013.01); *G02F 1/13781* (2013.01);
(Continued)

(58) Field of Classification Search
CPC .. G02F 1/134363; G02F 1/13452; G02F 1/33; G02F 2201/56; G09G 3/3611; G09G 2320/06
See application file for complete search history.

(56) References Cited

U.S. PATENT DOCUMENTS 7,499,141 B2 * 3/2009 Lai ........................ G02F 1/1345
257/59
8,576,154 B2 * 11/2013 Kim ...................... G09G 3/3648
345/98
(Continued)

FOREIGN PATENT DOCUMENTS

CN 106448587 A 2/2017
CN 107123394 A 9/2017

*Primary Examiner* — Carolyn R Edwards
*Assistant Examiner* — Eboni N Giles
(74) *Attorney, Agent, or Firm* — Kilpatrick Townsend & Stockton, LLP

(57) ABSTRACT

The disclosure discloses a display panel and a display device. The display panel includes a display region, and a non-display region adjacent to the display region. The display region includes a first display region and a second display region, the first display region includes first pixels arranged in an array, the second display region includes second pixels arranged in an array, and the number of pixels in any one row of the first pixels is less than the number of columns of the second pixels. The display panel further includes a gate driver circuit arranged in the non-display region and first signal lines, each of the first signal lines is connected with the gate driver circuit, and at least one of the first signal lines provides a row of first pixels with a control signal; a resistance compensation unit is disposed on at least one of the first signal lines.

20 Claims, 18 Drawing Sheets

(51) Int. Cl.
G02F 1/137 (2006.01)
G02F 1/33 (2006.01)
G09G 3/36 (2006.01)

(52) U.S. Cl.
CPC ............ *G02F 1/33* (2013.01); *G09G 3/3611* (2013.01); *G02F 2201/56* (2013.01); *G09G 2320/06* (2013.01)

(56) References Cited

U.S. PATENT DOCUMENTS

| | | | |
|---|---|---|---|
| 2008/0049156 A1* | 2/2008 | Kim | G02F 1/136286 349/40 |
| 2013/0335397 A1* | 12/2013 | Kim | G09G 3/006 345/212 |
| 2016/0071457 A1* | 3/2016 | Kim | G09G 3/2003 345/690 |
| 2017/0249906 A1* | 8/2017 | Noh | G09G 3/3266 |
| 2017/0337876 A1* | 11/2017 | Kim | G09G 3/3225 |
| 2017/0352311 A1* | 12/2017 | Lee | G09G 3/3225 |
| 2018/0151595 A1* | 5/2018 | Saitoh | H01L 29/7869 |
| 2018/0284551 A1* | 10/2018 | Shim | G09G 3/3266 |
| 2018/0342194 A1* | 11/2018 | Li | G09G 3/2092 |

* cited by examiner

DISPLAY PANEL AND DISPLAY DEVICE

CROSS-REFERENCE TO RELATED APPLICATIONS

This application claims priority to Chinese Patent Application No. 201710812736.2, filed on Sep. 11, 2017, the entire content of which is incorporated herein by reference.

FIELD

The present disclosure relates to the field of display technologies, and particularly to a display panel and a display device.

BACKGROUND

At present, display regions of display panels in general display devices, e.g., monitors, TV sets, mobile phones, tablet computers, etc., typically are regular rectangles. Taking a liquid crystal display device as an example, a display panel thereof is typically divided into a display region, and a non-display region adjacent to the display region, where a plurality of pixels are arranged in a matrix in the display region, each pixel is arranged with a switch element, and each switch element is connected with a scan line and a data line, so that a scan signal on the scan line is received to turn on the switch element, and a data signal on the data line is received to drive the pixel to display a specific grayscale; and switch elements of different pixels are connected with different combinations of scan lines and data lines, so that each pixel can emit light separately. A gate driver circuit (VSR) and a driver chip (IC) are arranged in the non-display region on the display panel, where the gate driver circuit is connected with the scan lines, and the driver chip is connected with the gate driver circuit and the data lines. The gate driver circuit receives a clock signal from the driver chip, and controls the array of pixels over the scan lines to display grayscales row by row.

As sciences and technologies are advancing, there are more and more diversified demands for the screen of the display device, so the display region of the display panel is also frequently designed into a shape other than the regular rectangle, and such a display panel is typically referred to as an abnormally shaped display panel. Due to the irregularly designed shape of the abnormally shaped display panel in the prior art, there are different loads on signal lines in respective zones, and also somewhat different delays of signals on the signal lines, so that an image may be displayed non-uniformly on the abnormally shaped display panel, thus degrading a display effect thereof.

SUMMARY

An embodiment of the disclosure provides a display panel including a display region, and a non-display region adjacent to the display region. The display region includes a first display region and a second display region, the first display region includes a plurality of first pixels arranged in an array, the second display region includes a plurality of second pixels arranged in an array, and the number of pixels in any one row of the first pixels is less than the number of columns of the second pixels. The display panel further includes a gate driver circuit and a plurality of first signal lines, the gate driver circuit is arranged in the non-display region, each of the first signal lines is connected with the gate driver circuit, and at least one of the first signal lines provides a row of first pixels with a control signal. A resistance compensation unit is disposed on at least one of the first signal lines.

An embodiment of the disclosure further provides a display device including a display panel. The display panel includes a display region, and a non-display region adjacent to the display region. The display region includes a first display region and a second display region, the first display region includes a plurality of first pixels arranged in an array, the second display region includes a plurality of second pixels arranged in an array, and the number of pixels in any one row of the first pixels is less than the number of columns of the second pixels. The display panel further includes a gate driver circuit and a plurality of first signal lines, the gate driver circuit is arranged in the non-display region, each of the first signal lines is connected with the gate driver circuit, and at least one of the first signal lines provides a row of first pixels with a control signal. A resistance compensation unit is disposed on at least one of the first signal lines.

BRIEF DESCRIPTION OF THE DRAWINGS

In order to make the technical solutions according to the embodiments of the disclosure or in the prior art more apparent, the drawings to which the embodiments or the prior art is described with reference will be introduced below in brief, and apparently the drawings to be described below are only some embodiments of the disclosure, and those ordinarily skilled in the art can further drive from these drawings other drawings without any inventive effort.

DETAILED DESCRIPTION OF THE EMBODIMENTS

Figure 1:
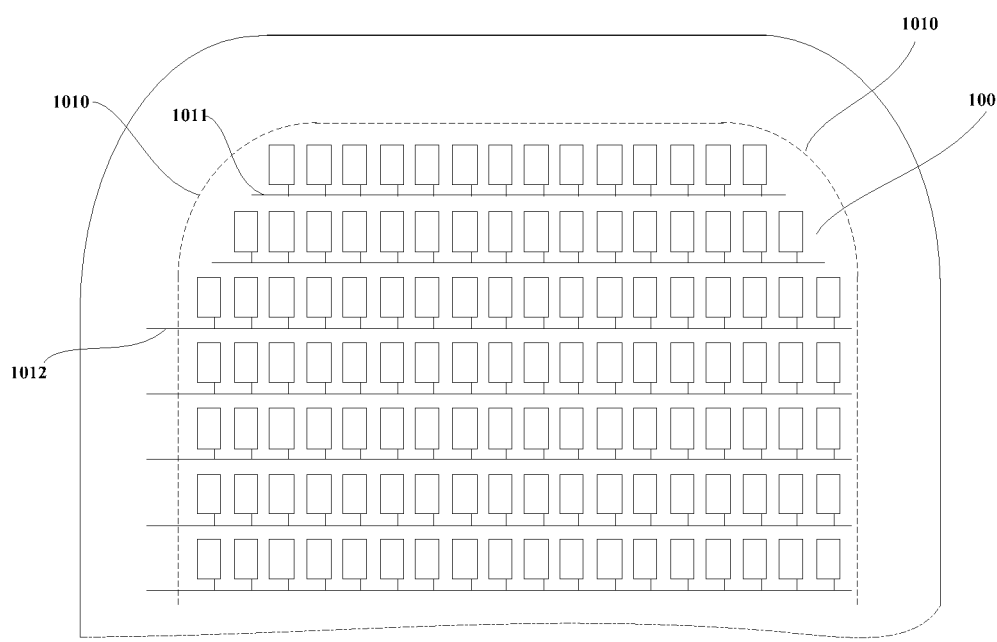
FIG. 1 is a schematic diagram of an abnormally shaped display panel according to an embodiment of the disclosure.

As illustrated in FIG. 1, there is an abnormally shaped display panel, as arranged in the existing layout, for an experimental design of a real product, and there are rounded corners 1010 respectively on two ends of the top edge of a display region 100. Due to the rounded corners 1010, pixels are arranged in such a way that the number of pixels in a row of pixels between the two rounded corners 1010 is less than the number of pixels in a row of pixels below the two rounded corners 1010, so a load on a scan line 1011 corresponding to the row of pixels between the two rounded corners 1010 is lower than a load on a scan line 1012 corresponding to the row of pixels below the two rounded corners 1010, and there is an also a significant difference in scan delay between the scan line 1011 and the scan line 1012, so that there is a significant difference between a grayscale of the row of pixels between the two rounded corners 1010 and a grayscale of the row of pixels below the two rounded corners 1010, thus degrading the uniformity of an image displayed on the abnormally shaped display panel, which may result in a poor effect of displaying the image.

In order to improve the uniformity of an image displayed on the abnormally shaped display panel, and the quality of the product, the following embodiments of the disclosure provide a display panel and a display device.

Figure 2:
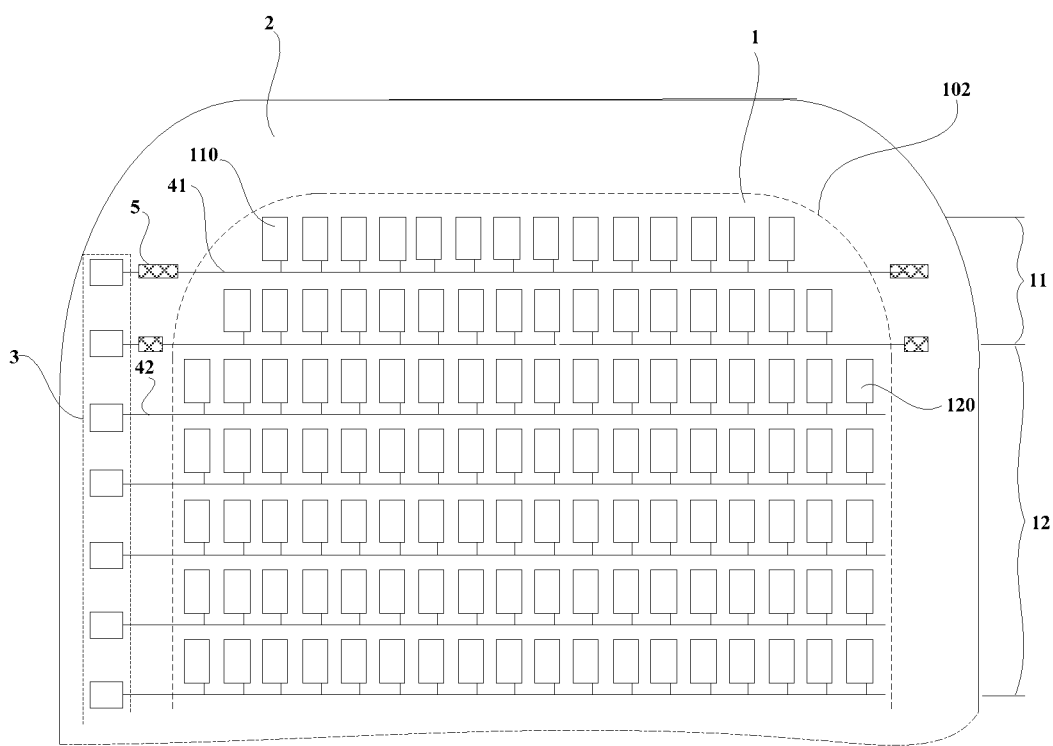
FIG. 2 is a schematic diagram of a first structural form of a display panel according to an embodiment of the disclosure.

As illustrated in FIG. 2, a display panel according to an embodiment of the disclosure includes a display region 1 (the area surrounded by the broken-line box as illustrated), and a non-display region 2 adjacent to the display region 1, where the display region 1 includes a first display region 11 and a second display region 12, the first display region 11 includes a plurality of first pixels 110 arranged in an array, the second display region 12 includes a plurality of second pixels 120 arranged in an array, and the number of pixels in any one row of the first pixels 110 is less than the number of columns of the second pixels 120. The display panel further includes a gate driver circuit 3 and a plurality of first signal lines 41, the gate driver circuit 3 is arranged in the non-display region 2, each of the first signal lines 41 is connected with the gate driver circuit 3, and at least one of the first signal lines 41 provides a row of first pixels 110 with a control signal. A resistance compensation unit 5 is disposed on at least one of the first signal lines 41.

In the embodiment of the disclosure, the display panel is an abnormally shaped display panel, that is, the display region 1 of the display panel is designed in a shape other than a regular rectangle. The particular shape of the display region I will not be limited thereto. As illustrated in FIG. 2, there are rounded corners 102 at the edge of the display region 1. In another embodiment of the disclosure, there may be at least one of a chamfer, an indentation, a notch, or a curved side at the edge of the display region, and in addition, there may be a hollow section in the display region.

In the embodiment of the disclosure, the non-display region 2 will not be limited to any particular shape as long as it can match in shape to the display region 1. As illustrated in FIG. 2, for example, there are rounded corners 102 in the display region 1, so rounded corners are also designed in corresponding sections of the non-display region 2. Alternatively, the shape of the non-display region may not match the shape of the display region. For example, there are indentations in the display region, and the non-display region is shaped in a regular and consecutive rectangle.

Figure 3:
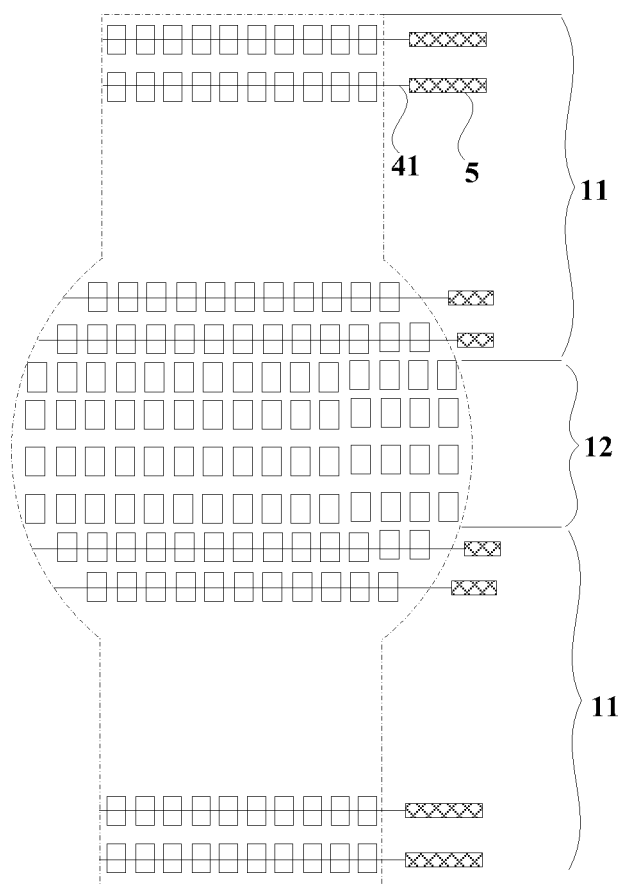
FIG. 3 is a schematic diagram of a second structural form of the display panel according to an embodiment of the disclosure.
Figure 4:
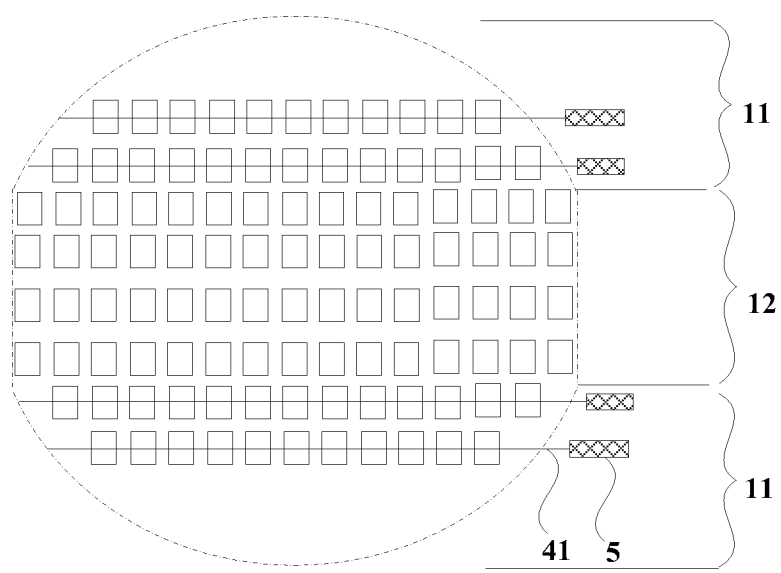
FIG. 4 is a schematic diagram of a third structural form of the display panel according to an embodiment of the disclosure.

It shall be noted that the first display region and the second display region may need to be divided according to the arrangement of the pixels, and the number of rows of pixels in the embodiment of the disclosure. In this embodiment, as illustrated in FIG. 3, the display region of the display panel includes two rectangular sections, and a dump-shaped section located between the two rectangular sections. As illustrated in FIG. 4, the display region of the display panel includes two arc-shaped sections, and a rectangular section located between the two arc-shaped sections. Under the division rule above, the first display region 11 and the second display region 12 are as illustrated respectively in FIG. 3 and FIG. 4. In an alternative embodiment, the display region of the display panel is a round, and there may be only one row of second pixels in the second display region. The display panel according to the embodiments illustrated in FIG. 3 and FIG. 4 can be applicable to a wearable display device, e.g., a smart watch, etc.

Further referring to FIG. 2, the display region 1 can be divided into the first display region 11 and the second display region 12 according to the arrangement of the pixels. The first display region 11 includes the plurality of first pixels 110 arranged in an array. The arrangement of the plurality of first pixels 110 in the row direction extends to the rounded corners 102 above. Alike when there is a hollow section in the display region, the arrangement of the plurality of first pixels in the row direction extends to the hollow section. The second display region 12 includes the plurality of second pixels 120 arranged in the array, and the plurality of second pixels 120 are arranged in a matrix, that is, there are the same number of second pixels 120 in each row, and the same number of second pixels 120 in each column. As illustrated in FIG. 2, the number of first pixels in any one row of the first pixels 110 is less than the number of columns of the second pixels 120 in the first display region 11 due to the rounded corners 102.

In order to drive the first pixels 110 and the second pixels 120 in the display region 11 to display, the display panel further includes: the gate driver circuit 3, the plurality of first signal lines 41, and a plurality of second signal lines 42. The gate driver circuit 3 is arranged in the non-display region, and includes a plurality of gate driver units 301. Each of the gate driver units 301 is connected with corresponding one of the first signal lines 41 or the second signal lines 42. Each row of first pixels 110 is provided by at least one of the first signal lines 41 with a control signal, and each row of second pixels 120 is provided by at least one of the second signal lines 42 with a control signal. The particular number of gate driver circuits 3, and their particular positions will not be limited thereto, for example, there may be two gate driver circuits arranged respectively on the left and right sides of the display region to provide the rows of pixels with a control signal concurrently or alternatively.

Since the abnormally shaped display panel in the prior art is designed in an irregular shape, there are different loads on the signal lines in the respective zones, and also somewhat different delays of signals on the signal lines, so that an image may be displayed non-uniformly on the abnormally shaped display panel, thus resulting in a poor effect of displaying the image.

However, in the technical solution according to the embodiment of the disclosure, the resistance compensation unit 5 is disposed on at least one of the first signal lines 41, and the display panel is designed and manufactured in such a way that the resistance of the resistance compensation unit 5, the particular number thereof, and the positional distribution thereof can be adjusted and designed flexibly according to the difference in load, and the difference in scan delay, between the first signal lines 41 and the second signal lines 42 to thereby alleviate effectively the difference in load, and the difference in scan delay, throughout the display panel. Accordingly the technical solution according to the embodiment of the disclosure can improve the uniformity of an image displayed on the abnormally shaped display panel, and the quality of the product.

The display panel is designed and manufactured in such a way that the resistance of the resistance compensation unit 5 can be adjusted flexibly in a resistance range of 0 to 10 KΩ so that the scan delays on the first signal lines 41 and the second signal lines 42 vary from 380 ns to 640 ns to thereby improve effectively the non-uniformity of an image displayed in the abnormally shaped display region.

Figure 5:
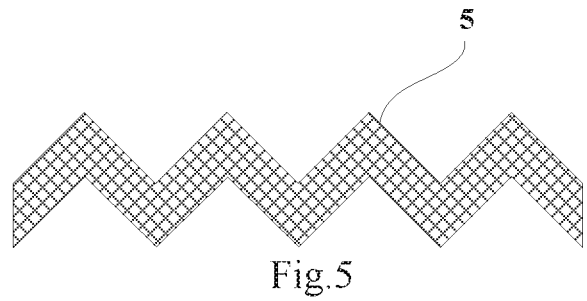
FIG. 5 is a schematic diagram of a first structural form of a resistance compensation unit according to an embodiment of the disclosure.
Figure 6:
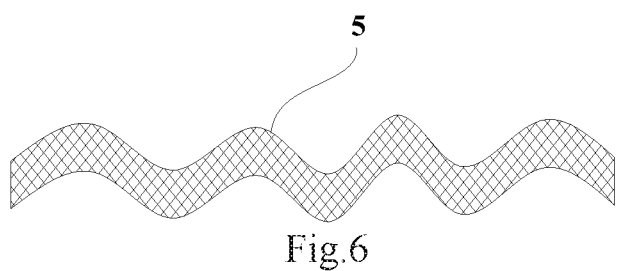
FIG. 6 is a schematic diagram of a second structural form of a resistance compensation unit according to an embodiment of the disclosure.

The resistance compensation unit 5 will not be limited to any particular shape, and in the embodiment of the disclosure, the resistance compensation unit is a linearly-shaped resistance wire. In an alternative embodiment of the disclosure, the resistance compensation unit 5 can alternatively be a resistance wire in a zigzag shape as illustrated in FIG. 5, in a curved shape, a helical shape, etc., as illustrated in FIG. 6. There may be a smaller area occupied for, but a larger real length of, the resistance wire designed in these nonlinear shapes, so there will be a higher resistance thereof.

Figure 7:
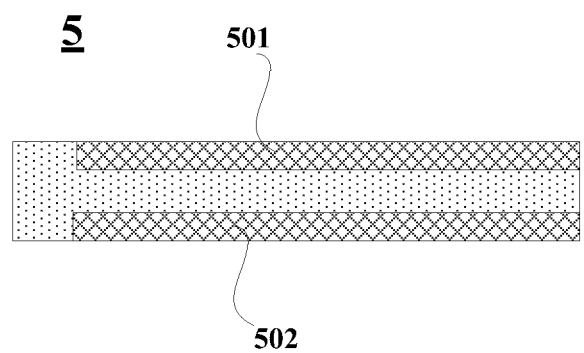
FIG. 7 is a schematic diagram of a third structural form of a resistance compensation unit according to an embodiment of the disclosure.

As illustrated in FIG. 7, in an implementation of the embodiment of the disclosure, the resistance compensation unit 5 can further include at least two layers of resistance wires 501 and 502 arranged at different layers, and overlapping with each other in the direction perpendicular to the display panel, and the at least two layers of resistance wires 501 and 502 are arranged in series. The at least two layers of resistance wires can be arranged at the different layers, overlapping with each other, and in series to the effect of also a smaller area thereof to be occupied, and a higher resistance thereof.

It shall be noted that the particular number, position, shape, wire length, possible serial or parallel arrangement of the layers of resistance wires, etc., of the resistance compensation unit 5 can be designed flexibly according to the particular structure of the display panel, a resistance compensation value required for the first signal lines as calculated or simulated, etc., but will not be limited to any particular embodiment above.

Based upon the same inventive idea as the embodiment illustrated in FIG. 2, in a display panel according to another embodiment of the disclosure, the display region further includes thin film transistors arranged corresponding to the first pixels and the second pixels, and the resistance compensation unit is made of the same material, and arranged at the same layer, as an active layer of the thin film transistors. The resistance compensation unit will not be limited to any particular material, and for example, can be doped amorphous-Si, doped poly-Si, doped oxide semiconductor, etc.

With the technical solution according to this embodiment, the resistance compensation unit can be fabricated in the same patterning process as the active layer of the thin film transistors, thus resulting in a low fabrication cost. After the resistance compensation unit and the active layer are patterned, further doping and injection can be performed on the resistance compensation unit to thereby adjust the resistance compensation unit to an appropriate resistance.

In a particular implementation of this embodiment, the thickness of the resistance compensation unit is smaller than the thickness of the active layer. As per Resistance $R_s$=Resistivity ρ/Thickness t, the smaller the thickness t is, the higher the resistance $R_s$ is, so the thickness of the resistance compensation unit is designed smaller so that the resistance of the resistance compensation unit can be higher. The length of the resistance compensation unit can be designed smaller so that the area to be occupied can be reduced to thereby further facilitate the design and arrangement of the resistance compensation unit.

Based upon the same inventive idea as the embodiment illustrated in FIG. 2, in a display panel according to a further embodiment of the disclosure, the display region includes pixel electrodes arranged corresponding to the first pixels and the second pixels. The resistance compensation unit is made of the same material, and arranged at the same layer, as the pixel electrodes.

The material of the pixel electrodes can be transparent electrically-conductive metal oxide. The transparent electrically-conductive metal oxide will not be limited to any particular material, and for example, can be indium tin oxide ITO, zinc indium oxide IZO, etc. The resistivities of these materials are typically higher than those of metal materials, so they can be applicable to the resistance compensation unit. When the display panel is an organic light-emitting diode display panel, the pixel electrodes can particularly be anodes of light-emitting elements.

With the technical solution according to this embodiment, the resistance compensation unit can be fabricated in the same patterning process as the pixel electrodes, thus resulting in a low fabrication cost.

Figure 8:
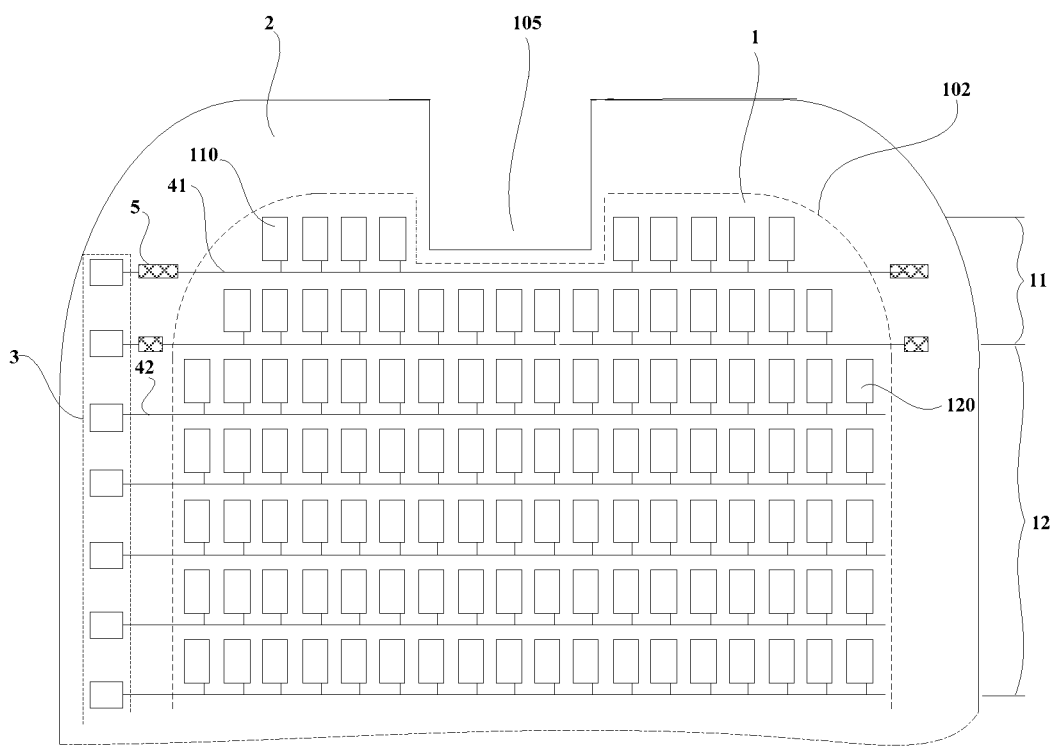
FIG. 8 is a schematic diagram of a first structural form of the display panel according to another embodiment of the disclosure.
Figure 9:
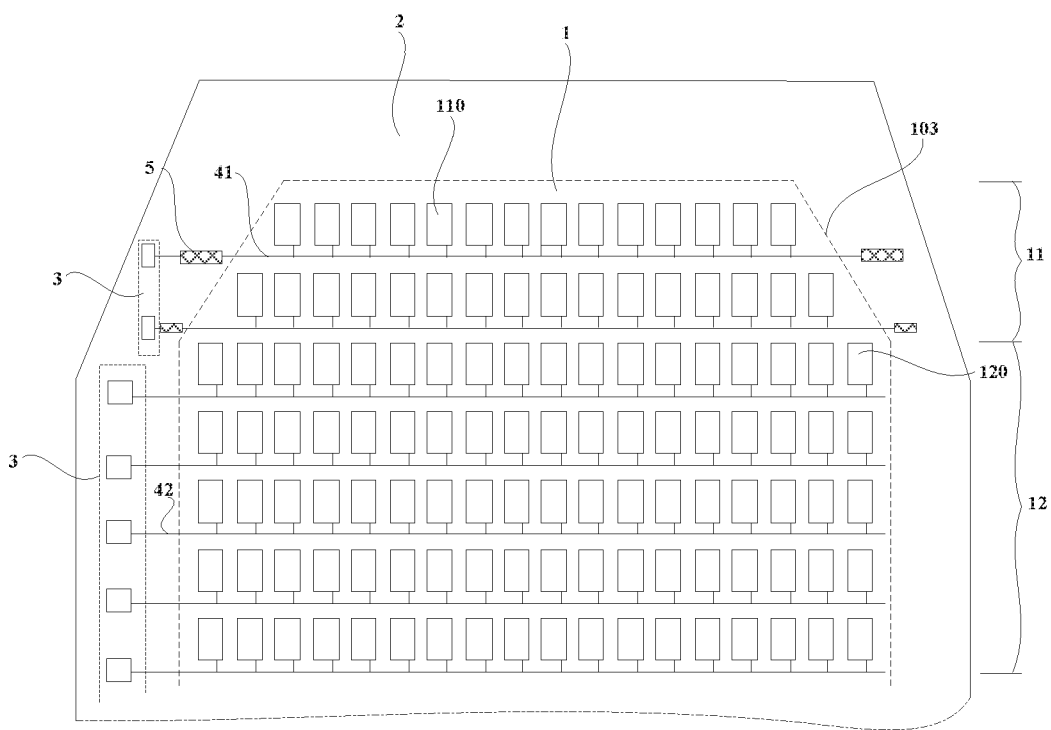
FIG. 9 is a schematic diagram of a second structural form of the display panel according to another embodiment of the disclosure.
Figure 10:
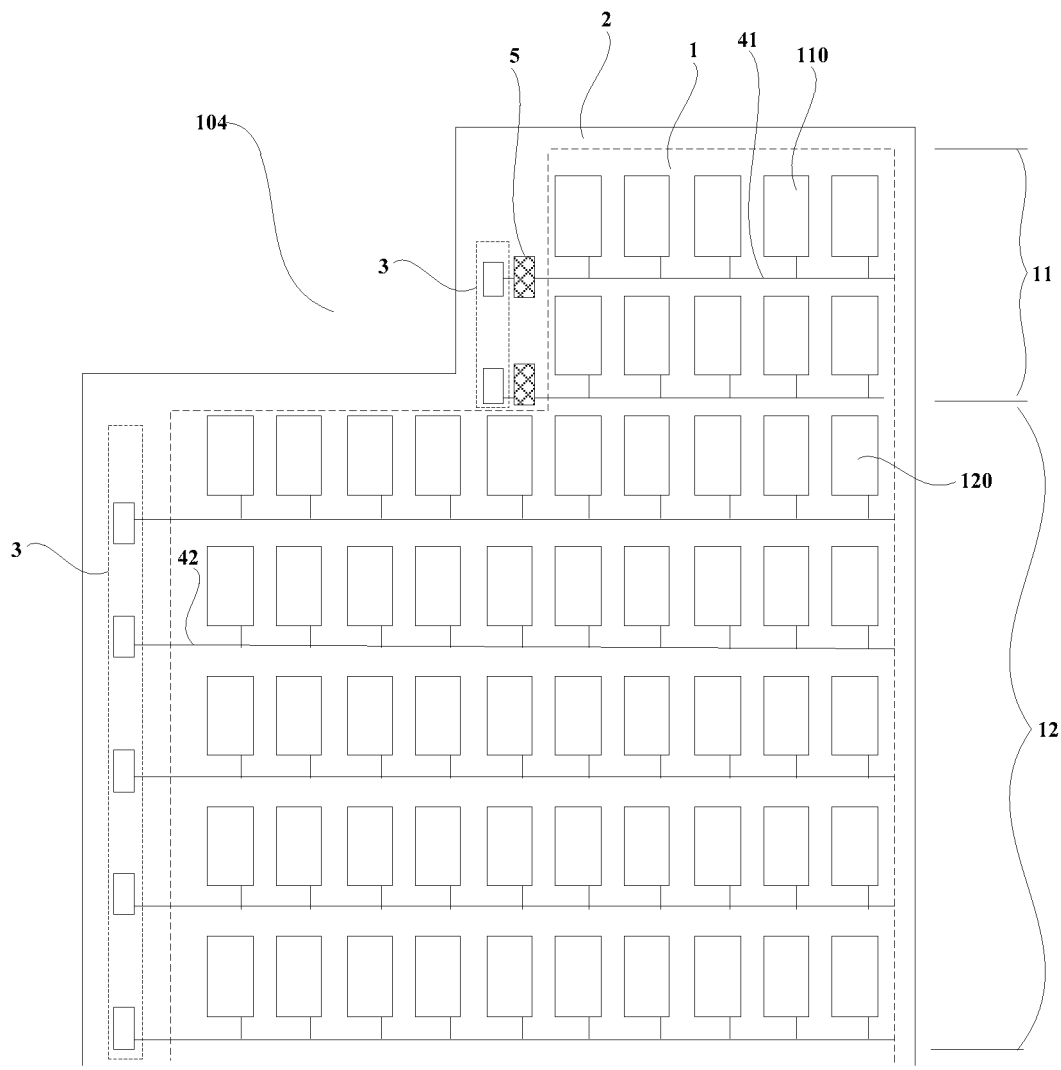
FIG. 10 is a schematic diagram of a third structural form of the display panel according to another embodiment of the disclosure.
Figure 11:
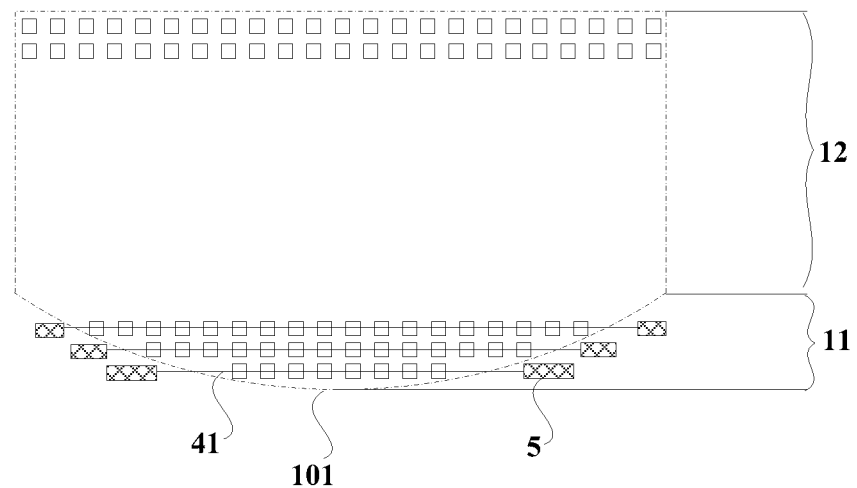
FIG. 11 is a schematic diagram of a fourth structural form of the display panel according to another embodiment of the disclosure.

Based upon the same inventive idea as the embodiment illustrated in FIG. 2, embodiments of the disclosure further provide several further particular structural forms of the display panel as illustrated in FIG. 8 to FIG. 11. As illustrated in FIG. 8, there are both an indentation 105 and the rounded corners 102 at the edge of the display region 1 of the display panel. As illustrated in FIG. 9, there are chambers 103 at the edge of the display region 1 of the display panel. As illustrated in FIG. 10, there is a notch at the edge of the display region 1 of the display panel. As illustrated in FIG. 11, there is a curved side 101 at the edge of the display region 1 of the display panel.

As illustrated in FIG. 10, the resistance compensation unit 5 is located on the end of the first signal line 41 close to the gate driver circuit 3.

There is a column of pixels absent on the side of the first display region 11 close to the gate driver circuit 3 as compared with the second display region 12 due to the abnormally shaped edge, and the resistance compensation unit 5 is disposed on the end of the first signal line 41 close to the gate driver circuit 3, so that a current on the first signal line 41 can be reduced before a row of first pixels 110 receive a control signal, to thereby eliminate the differences in charging delay among the same column of pixels due to the absence of the column of pixels so as to improve the uniformity of a displayed image.

As illustrated in FIG. 9, the resistance compensation units 5 are disposed on both ends of the first signal line 41.

There are columns of pixels absent on the side of the first display region 11 close to the gate driver circuit 3 and on the side of the first display region 11 away from the gate driver circuit 3, due to the abnormally shaped edge. The resistance compensation unit 5 is disposed on the end of the first signal line 41 close to the gate driver circuit 3, so that a current on the first signal line 41 can be reduced before a row of first pixels 110 receive a control signal, to thereby eliminate the differences in charging delay among the same column of pixels due to the absence of the column of pixels. The resistance compensation unit 5 is also disposed on the end of the first signal line 41 away from the gate driver circuit 3, so that the differences in load between the first signal lines 41, and between the first signal line 41 and the second signal line 42 can be further compensated for as a whole to thereby further alleviate the difference in scan delay throughout the display panel so as to improve the uniformity of a displayed image.

In the embodiment above of the disclosure, the resistance compensation units 5 are disposed on the respective first signal lines 41, and at least two of the first signal lines 41 correspond respectively to different numbers of first pixels 110. The resistance of the resistance compensation unit 5 on the first signal line 41 on which a larger number of first pixels 110 are connected is lower than the resistance of the resistance compensation unit 5 on the first signal line 41 on which a smaller number of first pixels 110 are connected.

As illustrated in FIG. 9, in this particular implementation, each row of first pixels 110 corresponds to one of the first signal lines 41, the numbers of first pixels 110 to which the plurality of first signal lines 41 correspond respectively ascend sequentially along the column direction, and the resistances of the resistance compensation units 5 on the plurality of first signal lines 41 descend sequentially along the column direction.

FIG. 9 illustrates the display region 1 with the chambers 103 (or the rounded corners 102 as illustrated in FIG. 2) on the top edges thereof, and if there are chambers (or rounded corners) on the bottom edges of the display region 1, then the numbers of first pixels to which the plurality of first signal lines correspond respectively may descend sequentially along the column direction, and the resistances of the resistance compensation units on the plurality of first signal lines ascend sequentially along the column direction.

When the resistance compensation units 5 are resistance wires, the resistances of the resistance compensation units 5 on the plurality of first signal lines 41 can descend sequentially along the column direction particularly in such a way that the areas of cross sections of the resistance wires on the plurality of first signal lines 41 do not vary, and their lengths descend sequentially, as illustrated in FIG. 9. Or the lengths of the resistance wires on the plurality of first signal lines do not vary, and the areas of their cross sections ascend sequentially.

Accordingly as illustrated in FIG. 11, the resistances of the resistance compensation units 5 on the plurality of first signal lines 41 can ascend sequentially along the column direction particularly in such a way that the areas of cross sections of the resistance wires on the plurality of first signal lines 41 do not vary, and their lengths ascend sequentially, as illustrated in FIG. 11. Or the lengths of the resistance wires on the plurality of first signal lines do not vary, and the areas of their cross sections descend sequentially.

In order to equalize the loads on the respective first signal lines 41, a smaller total resistance of the resistance compensation unit 5 may need to be matched with the first signal line 41 on which a larger number of first pixels 110 are connected, and a larger total resistance of the resistance compensation unit 5 may need to be matched with the first signal line 41 on which a smaller number of first pixels 110 are connected, so that the loads on the respective first signal lines 41 tend to be equalized to thereby alleviate effectively the difference in scan delay between the rows of pixels in the first display region 11 so as to improve the uniformity of an image displayed in the first display region 11.

Based upon the same inventive idea as the first embodiment, embodiments of the disclosure further provide several further particular structural forms of the display panel.

Figure 12:
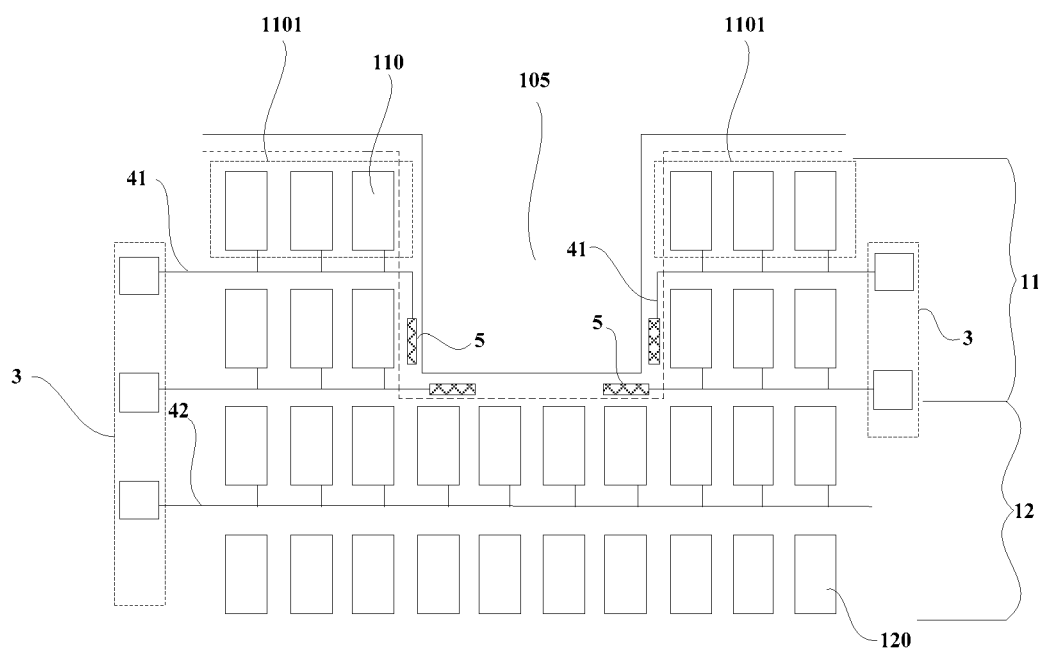
FIG. 12 is a schematic diagram of a first structural form of the display panel according to a further embodiment of the disclosure.
Figure 13:
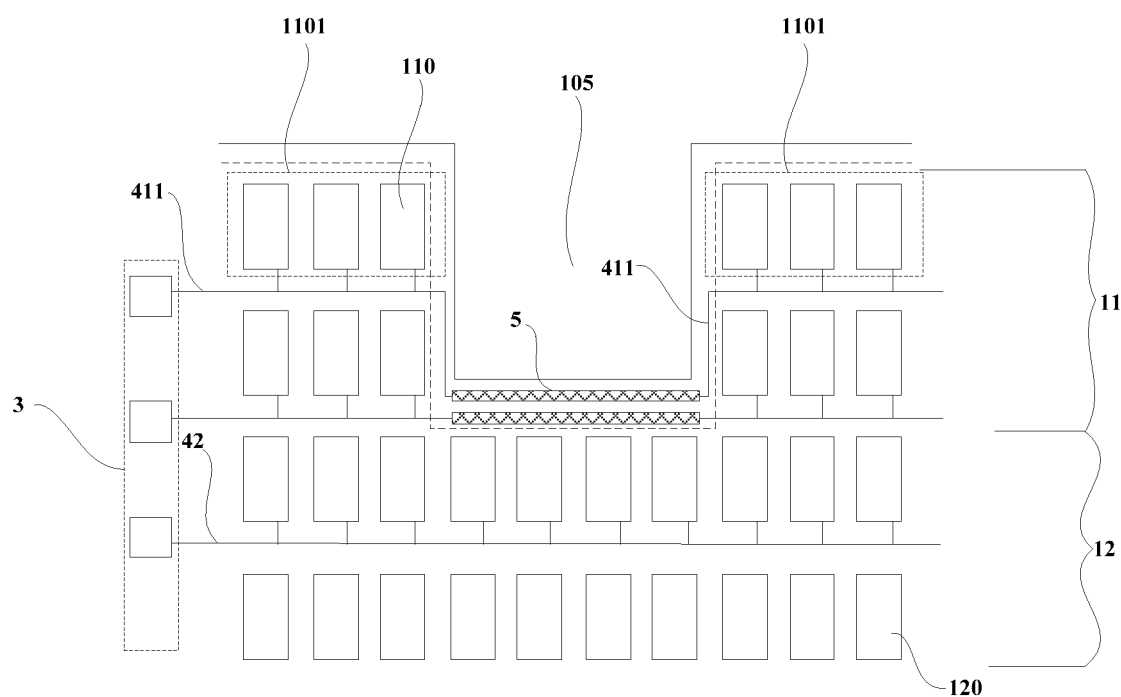
FIG. 13 is a schematic diagram of a second structural form of the display panel according to a further embodiment of the disclosure.

As illustrated in FIG. 12 and FIG. 13, there is the indentation 105 in the display region of the display panel. The arrangement of the plurality of first pixels 110 in the first display region 11 in the row direction extends to the indentation 105. Each row of first pixels 110 is separated by the indentation 105 into several groups of first pixels 1101.

Figure 14:
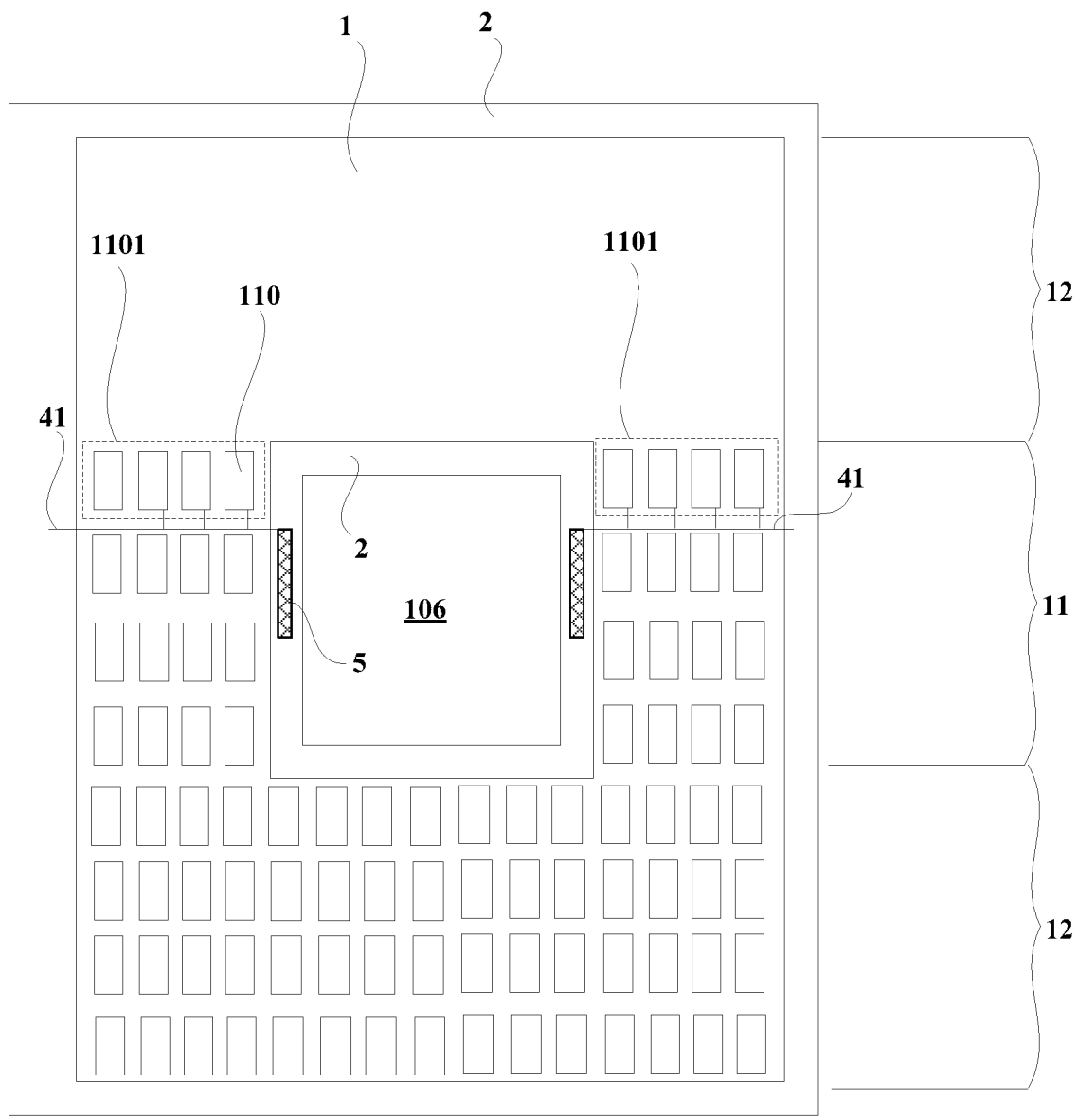
FIG. 14 is a schematic diagram of a third structural form of the display panel according to a further embodiment of the disclosure.
Figure 15:
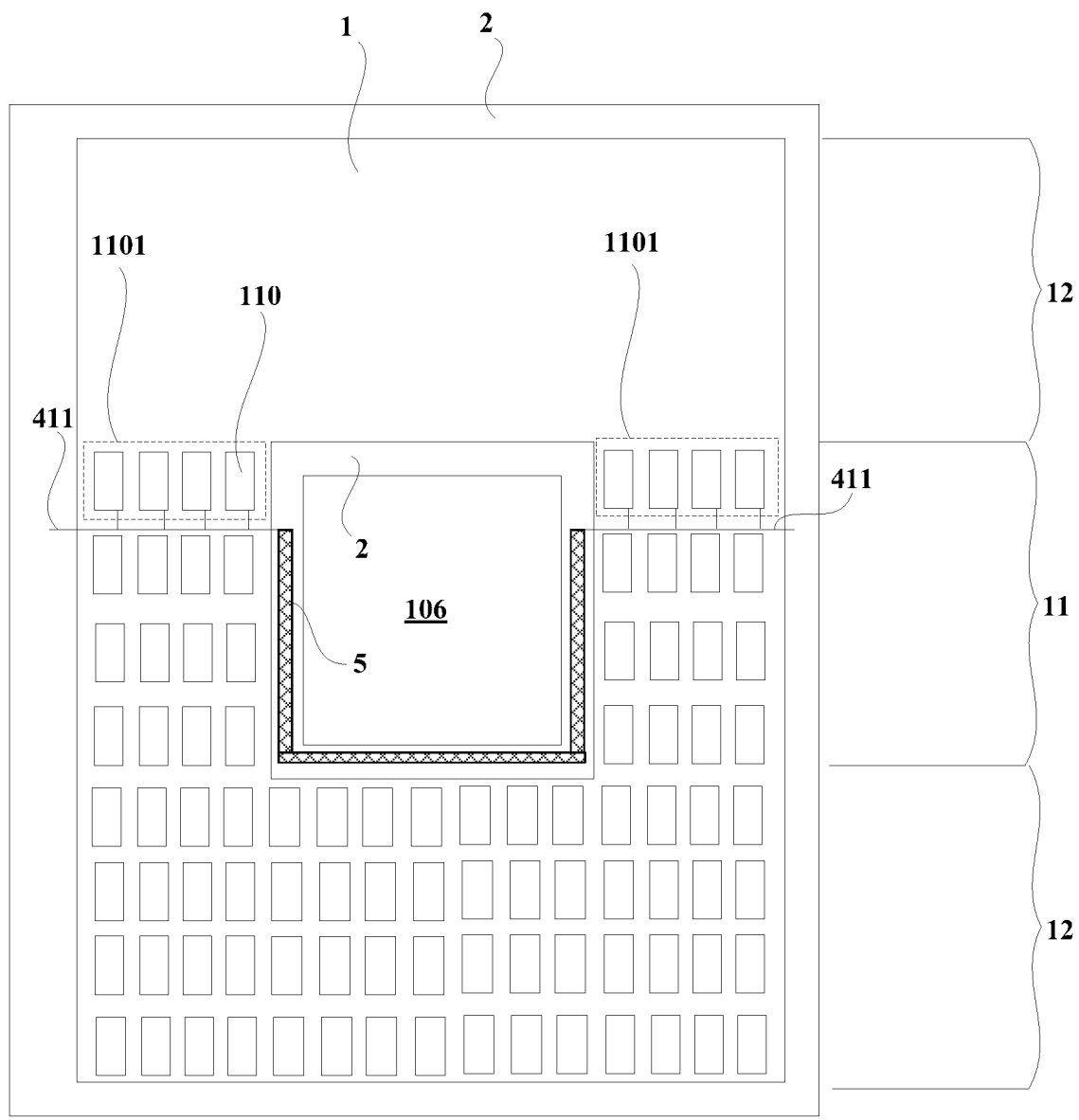
FIG. 15 is a schematic diagram of a fourth structural form of the display panel according to a further embodiment of the disclosure.

As illustrated in FIG. 14 and FIG. 15, there is a hollow section 106 in the display region 1 of the display panel. The arrangement of the plurality of first pixels 110 in the first display region 11 in the row direction extends to the hollow section 106. Each row of first pixels 110 is separated by the hollow section 106 into several groups of first pixels 1101.

In the embodiments illustrated in FIG. 12 and FIG. 14, the gate driver circuits 13 are located on the left and right sides of the display region (not illustrated in FIG. 14), each group of first pixels 1101 is connected respectively to corresponding one of the first signal lines 41, and the resistance compensation unit 5 is located on the end of the first signal line 41 away from the gate driver circuit 3. That is, the resistance compensation unit 5 can be arranged in the indentation 105 (or the hollow section 106 in FIG. 14) of the display region, and located in the non-display region of the display panel. It shall be noted that the resistance compensation unit can alternatively be disposed on the end of the first signal line away from the gate driver circuit in respective other embodiments of the disclosure.

In the embodiments illustrated in FIG. 13 and FIG. 15, each row of first pixels 110 is connected to corresponding one of the first signal lines, the first signal line is spaced by the indentation 105 (or the hollow section 106) into several first sub-signal lines 411, and the resistance compensation unit 5 is located between, and electrically connects, adjacent two of the first sub-signal lines 411.

As illustrated in FIG. 12, when the non-display region is arranged at the edge of the indentation 105 (or the hollow section 106 in FIG. 14) along the indentation 105 (or the hollow section 106 in FIG. 14) of the display region, the resistance compensation unit 5 can be arranged in the non-display region and at a part of the edge of the indentation 105 (or the hollow section 106 in FIG. 14).

Figure 16:
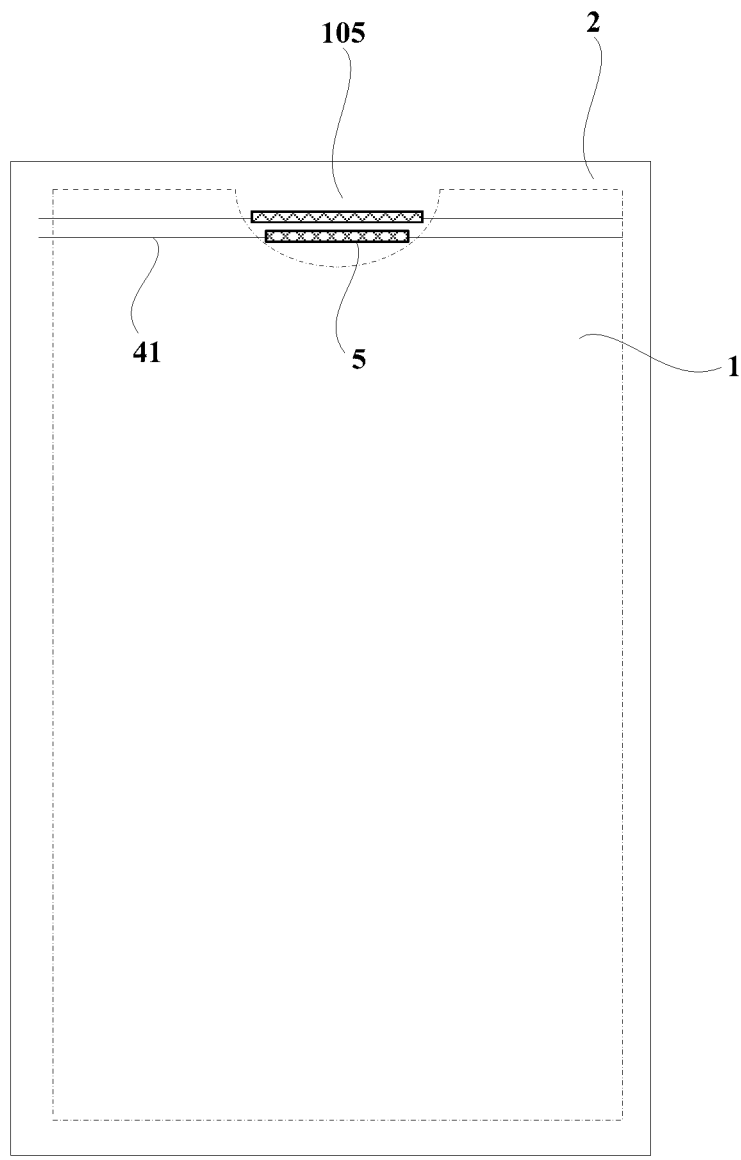
FIG. 16 is a schematic diagram of a fifth structural form of the display panel according to a further embodiment of the disclosure.

Furthermore as illustrated in FIG. 16, when the indentation 105 (or the hollow section 106 in FIG. 14) in the display region 1 is filled with the non-display region 2, the resistance compensation unit 5 can alternatively be arranged in the indentation 105 (or the hollow section 106 in FIG. 14) along the direction of the first sub-signal lines 411. Taking the embodiment illustrated in FIG. 16 as an example, a substrate of the display panel is reserved at the indentation 105 instead of being cut away, neither pixel nor pixel circuit is arranged at the indentation 105, and the resistance compensation unit 5 is disposed on the substrate. The resistance compensation unit 5 can be a metal wire or a poly-Si wire with a wire width below 5 micrometers fabricated at the same layer as wires in the display region 1, so it can macroscopically remain invisible, that is, the display panel remains transparent at the indentation 105. Moreover in this arrangement, the resistance compensation unit 5 may not be arranged around the indentation 105 to thereby facilitate a reduction in width of an edge frame at the indentation 105.

In an implementation of this embodiment of the disclosure, the resistance compensation unit 5 is embodied as two layers of resistance wires connected in parallel, so that the resistance of the resistance compensation unit 5 is lower due to the resistance wires connected in parallel, but the length of each layer of resistance wire can be designed longer, thus facilitating the wiring arrangement of the resistance compensation unit 5, and the design and adjustment of the resistance thereof.

Figure 17:
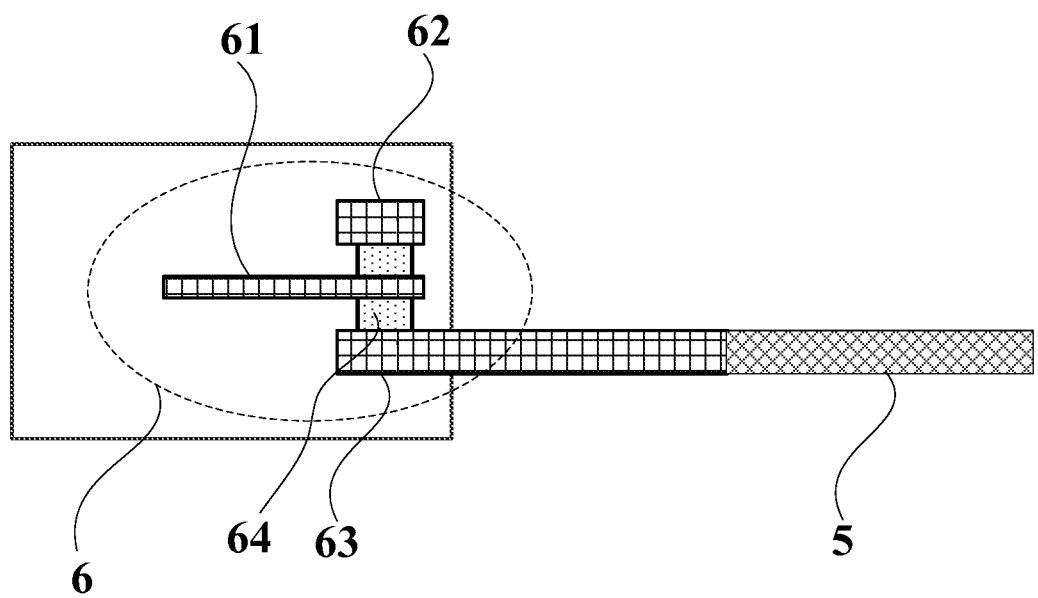
FIG. 17 is a top view of a connection between a resistance compensation unit and an output transistor according to an embodiment of the disclosure.
Figure 18:
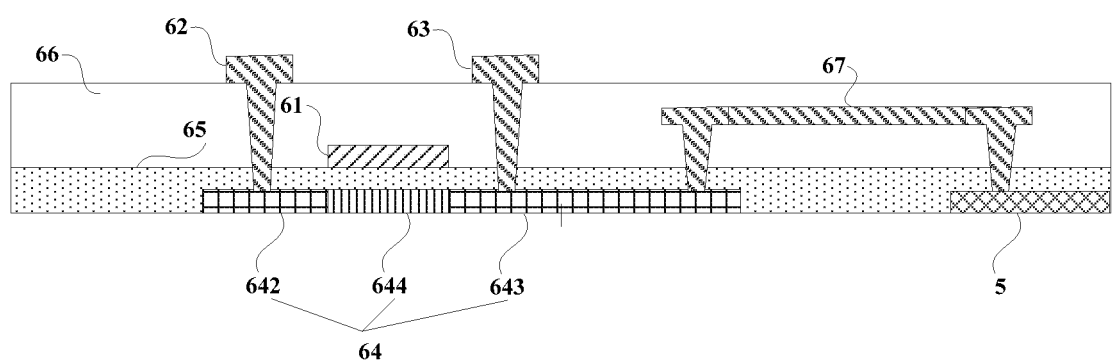
FIG. 18 is a sectional view of a resistance compensation unit connected with an output transistor in a connection pattern according to an embodiment of the disclosure.
Figure 19:
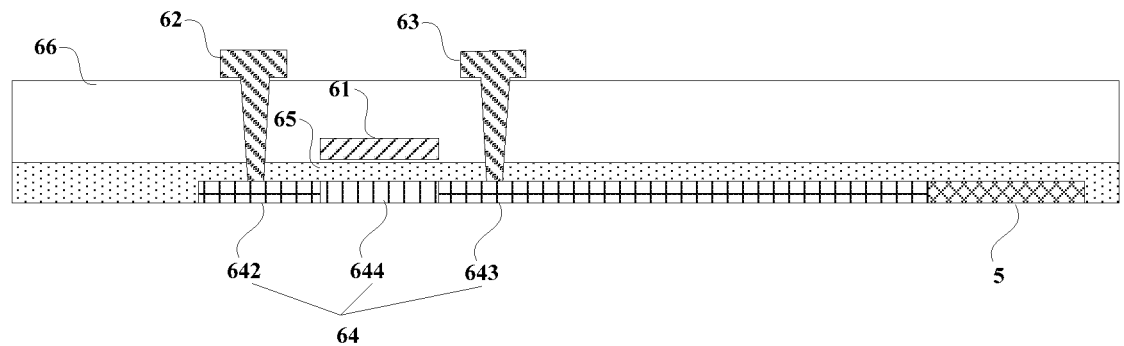
FIG. 19 is a sectional view of a resistance compensation unit connected with an output transistor in another connection pattern according to an embodiment of the disclosure.

Based upon the same inventive idea as the embodiment illustrated in FIG. 2, as illustrated in FIG. 17 to FIG. 19, in the display panel according to the embodiment of the disclosure, each gate driver unit of the gate driver circuit includes an output transistor 6, and the output transistor 6 includes a gate 61, an active layer 64, a first insulation layer 65 spacing the gate 61 from the active layer 64, a source 62, and a drain 63. The active layer 64 of the output transistor 6 includes a source contact area 642, a drain contact area 643, and a channel area 644 connecting the source contact area 642 with the drain contact area 643, and the source 62 and the drain 63 are connected respectively with the source contact area 642 and the drain contact area 643 through via holes in the second insulation layer 66.

The output transistor 6 is particularly a low-temperature poly-Si LTPS-type transistor, where the source 62 is connected with a high-potential signal line VGH or a low-potential signal line VGL. When the gate 61 receives a switching signal, the source 62 is communicated with the drain 63. The gate driver circuit provides the first signal line with a high-potential VGH control signal or a low-potential VGL control signal. The resistance compensation unit 5 on the first signal line compensates for a load on the first signal line, so that there are matching loads between the respective first signal lines, and between the first signal line and the second signal line, thus alleviating effectively the difference in scan delays between the rows of pixels in the display panel, and improving the uniformity of a displayed image.

The resistance compensation unit 5 and the active layer 64 can be made of the same doped low-temperature poly-Si material, and patterned in the same patterning process, and thereafter doping and injection can be further performed in the source contact area 642, the drain contact area 643, and the area of the resistance compensation unit 5 to thereby adjust them to appropriate resistances.

As illustrated in FIG. 18, in an implementation of this embodiment, the resistance compensation unit 5 is arranged at the same layer as the drain contact area 643 of the active layer 64, but the resistance compensation unit 5 and the drain contact area 643 are not connected directly. The resistance compensation unit 5 and the drain contact area 643 are connected respectively with a connection line 67 arranged at a different layer through via holes in the second insulation layer 66 to thereby be connected with each other.

As illustrated in FIG. 19, in another implementation of this embodiment, the resistance compensation unit 5 is connected directly with the drain contact area 643 of the active layer 64. In this structure, neither the connection line nor the via-holes structured in the second insulation layer may be further needed, thus simplifying a fabrication process and lowering a production cost.

Figure 20:
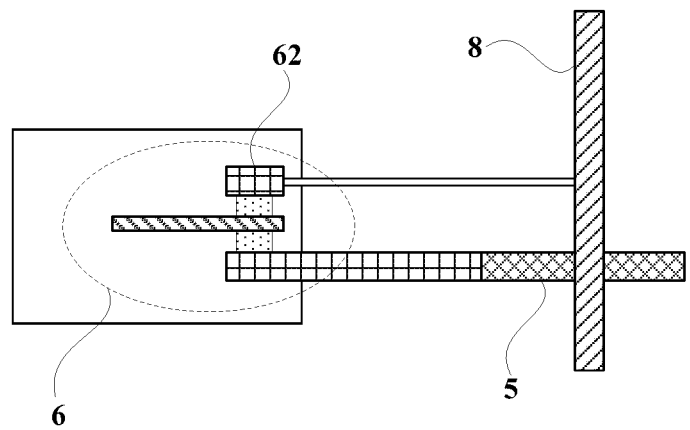
FIG. 20 is a top view of a structural relationship between a resistance compensation unit, an output transistor, and a fixed potential line according to an embodiment of the disclosure.
Figure 21:
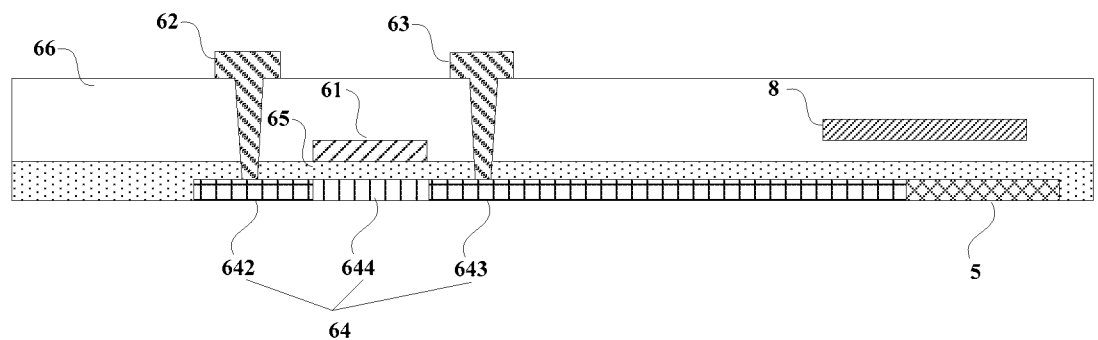
FIG. 21 a sectional view of a resistance compensation unit, an output transistor, and a fixed potential line according to an embodiment of the disclosure.

Based upon the same inventive idea as the embodiment illustrated in FIG. 2, as illustrated in FIG. 20 and FIG. 21, in a display panel according to a further embodiment of the disclosure, the non-display region further includes a fixed-potential line 8. The resistance compensation unit 5 is arranged at a different layer from the fixed-potential line 8, and overlaps with the fixed-potential line 8 in the direction perpendicular to the display panel.

The fixed-potential line 8 will not be limited to any particular type. For example, the fixed-potential line 8 can be a reference voltage line Vref or a cathode wire of an organic light-emitting diode pixel circuit, the high-potential signal line VGH or the low-potential signal line VGL of the gate driver circuit, a ground line GND, etc.

Alternatively the fixed-potential line 8 can be an additionally arranged fixed-potential electrode which can be connected with the source 62 of the output transistor 6 of the gate driver circuit. The fixed-potential line 8 may be arranged above the resistance compensation unit 5.

With the technical solution according to the embodiment of the disclosure, there is such a compensation capacitor defined by the resistance compensation unit 5 overlapping with the fixed-potential line 8 that can compensate for a capacitance of the pixel circuit. The overlapping area and the spacing between the resistance compensation unit 5 and the fixed-potential line 8 can be particularly determined according to a required capacitance compensation value. Moreover the fixed-potential line 8 is arranged above the resistance compensation unit 5, and the fixed-potential line 8 can act as a shielding layer to alleviate the transistors from being illuminated while the display panel is being manufactured, to thereby alleviate leakage current from arising so as to lower noise.

In the respective embodiments of the disclosure, the first signal lines will not be limited to any particular type. For example, when the display panel is a liquid crystal display panel, the first signal lines can be scan control signal lines; and when the display panel is an organic light-emitting diode display panel, the first signal lines can be scan control signal lines or light-emission control signal lines. The second signal lines in the second display region are of the same type of the first signal line in the first display region, so a repeated description thereof will be omitted here.

Figure 22:
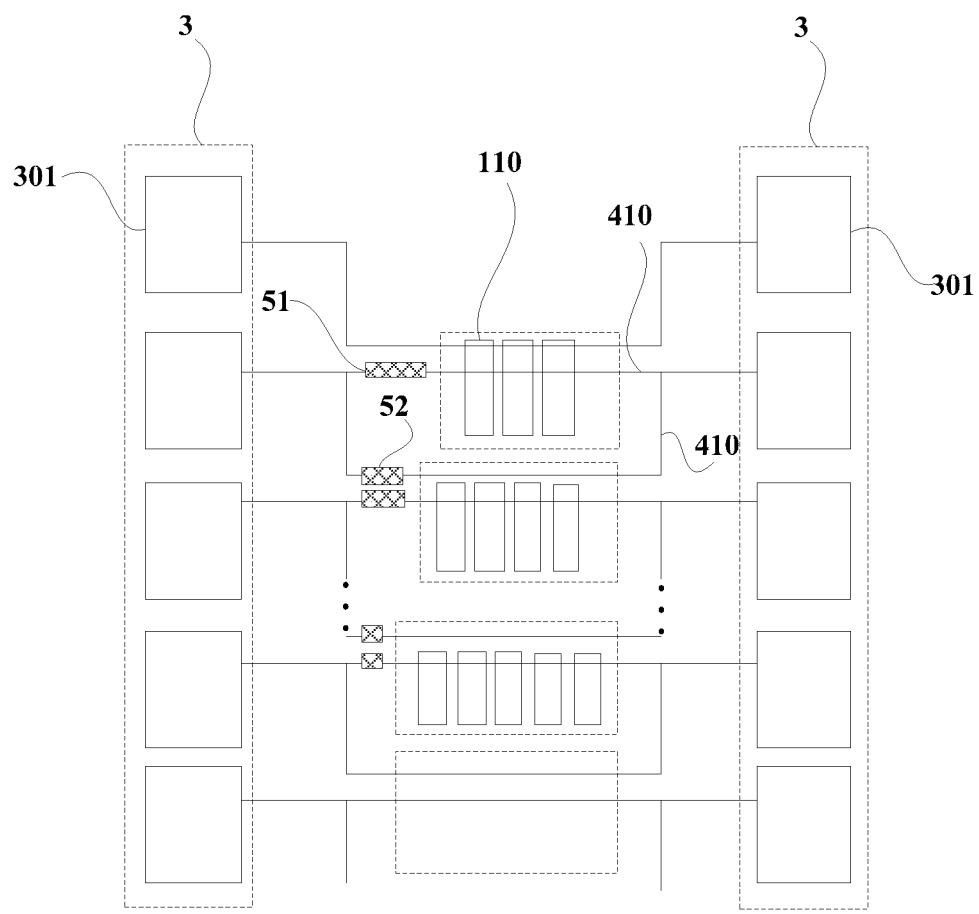
FIG. 22 is a schematic diagram of a connection relationship between a scan control signal line and a row of pixels according to an embodiment of the disclosure.

Based upon the same inventive idea, as illustrated in FIG. 22, in the display panel according an embodiment of the disclosure, each gate driver circuit 3 includes a plurality of gate driver units 301. Each of the gate driver units other than the first gate driver unit is connected with two corresponding adjacent rows of first pixels 110 through two scan control signal lines 410, and each row of first pixels 110 is connected with the two scan control signal lines 410. That is, both the first scan control signal line 410 connected with the n-th row of first pixels 110, and the second scan control signal line 410 connected with the (n−1)-th row of first pixels 110 are connected with the n-th gate driver unit, where n is a natural number.

In this embodiment, when there are different numbers of first pixels in two adjacent rows of first pixels 110, there are also different resistances of resistance compensation units disposed on two scan control signal lines 410 connected with the same gate driver unit. The resistance of the resistance compensation unit 52 on the scan control signal line 410 on which a larger number of first pixels 110 are connected is lower than the resistance of the resistance compensation unit 52 on the scan control signal line 410 on which a smaller number of first pixels 110 are connected.

When there are different numbers of first pixels in two adjacent rows of first pixels 110, for two scan control signal lines 410 connected with the same gate driver unit, the resistance compensation unit with a higher resistance can be disposed on the scan control signal line 410 on which a smaller number of first pixels 110 are connected, to thereby alleviate effectively the difference in delay in scanning and turning on the pixels arising from the different numbers of pixels so as to improve the uniformity of a displayed image.

When the display panel is an organic light-emitting diode display panel, and the first signal lines are light-emission control signal lines, a similar structure to the structure above can also be applicable thereto to thereby alleviate effectively the difference in light-emission delay arising from the different numbers of pixels so as to improve the uniformity of a displayed image.

Figure 23:
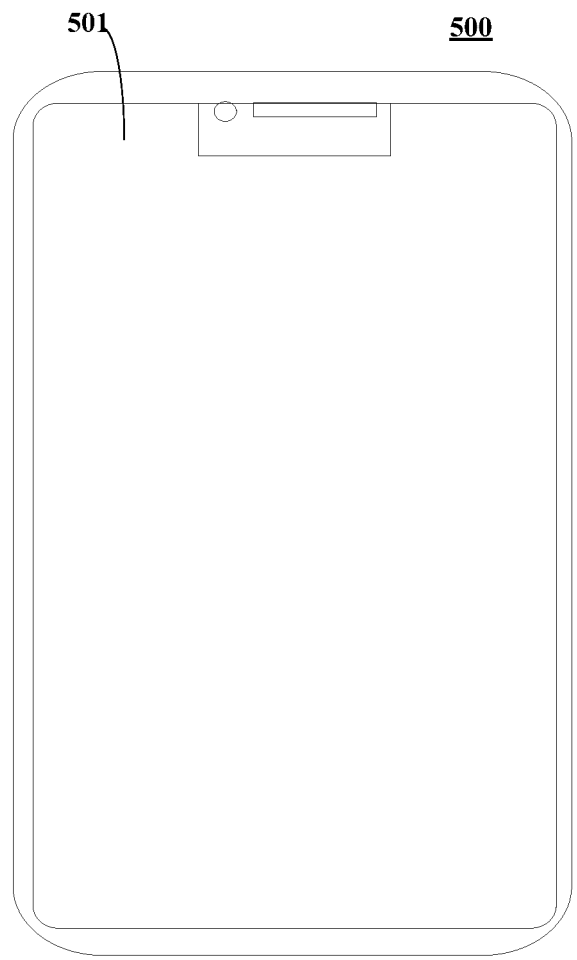
FIG. 23 is a schematic diagram of a display device according to an embodiment of the disclosure.

As illustrated in FIG. 23, an embodiment of the disclosure further provides a display device 500 including the display panel 501 according to any one of the technical solutions above. Since the display panel has the advantageous effects above, there is higher uniformity of an image displayed on the display device, and a higher quality of the product.

The screen of the display device, i.e., the display region of the display panel, will not be limited to any particular shape, and for example, there may be an indentation, a rounded corner, a chamber, a notch, a curved side, etc., at the edge of the display region, and also there may be a hollow section in the display region. The overall shape of the display panel may or may not match the shape of the display region, although the embodiments of the disclosure will not be limited thereto. A functional button, a webcam, a flash lamp, a distance sensor, an ambient light sensor, a 3D sensor, a pressure touch sensor, a fingerprint recognition sensor, or another component required for the display device can be arranged at the indentation, the rounded corner, the chamber, the notch, etc., and in the hollow area.

The display device will not be limited to any particular type, and for example, can be a monitor, a flat panel TV set, a tablet computer, a mobile phone, an advertisement exhibition screen, an information indicating screen, an on-vehicle display screen, a smart watch, a smart wristband, VR/AR glasses, etc.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display panel, comprising:
   a display region, and a non-display region adjacent to the display region, wherein:
   the display region comprises a first display region and a second display region, the first display region comprises a plurality of first pixels arranged in an array, the second display region comprises a plurality of second pixels arranged in an array, the number of pixels in any one row of the first pixels is less than the number of columns of the second pixels, each row of the first pixels of the first display region is parallel to each row of the second pixels of the second display region, and each column of the first pixels of the first display region is on an extension line of a line where a corresponding column of the second pixels of the second display region is located;
   the display panel further comprises a gate driver circuit and a plurality of first signal lines, the gate driver circuit is arranged in the non-display region, each of the first signal lines is connected with the gate driver circuit, and at least one of the first signal lines provides a row of first pixels with a control signal; and
   a resistance compensation unit is disposed on at least one of the first signal lines;
   wherein an indentation or a hollow section is in the display region, the arrangement of the plurality of first pixels in the first display region in the row direction extends to the indentation or the hollow section, and each row of first pixels is separated by the indentation or the hollow section into several groups of first pixels;
   wherein each row of first pixels is connected to corresponding one of the first signal lines, the first signal line is spaced by the indentation or the hollow section into several first sub-signal lines, and the resistance compensation unit is located between, and electrically connects, adjacent two of the first sub-signal lines.

2. The display panel according to claim 1, wherein the display region further comprises thin film transistors arranged corresponding to the first pixels and the second pixels, and the resistance compensation unit is made of the same material, and arranged at the same layer, as an active layer of the thin film transistors.

3. The display panel according to claim 2, wherein the thickness of the resistance compensation unit is smaller than the thickness of the active layer.

4. The display panel according to claim 2, wherein the material of the resistance compensation unit comprises doped amorphous-Si, doped poly-Si or doped oxide semiconductor.

5. The display panel according to claim 1, wherein the display region comprises pixel electrodes arranged corresponding to the first pixels and the second pixels, and the resistance compensation unit is made of the same material, and arranged at the same layer, as the pixel electrodes.

6. The display panel according to claim 5, wherein the material of the pixel electrodes comprises transparent electrically-conductive metal oxide.

7. The display panel according to claim 1, wherein the resistance compensation unit is a resistance wire in one or more of: a zigzag shape, a curved shape, and a helical shape.

8. The display panel according to claim 1, wherein the resistance compensation unit comprises at least two layers of resistance wires arranged at different layers, and overlapping with each other in the direction perpendicular to the display panel, and the at least two layers of resistance wires are arranged in series.

9. The display panel according to claim 1, wherein there is a curved side, a rounded corner, a chamber, or a notch at an edge of the display region, and the arrangement of the plurality of first pixels in the first display region in the row direction extends to the curved side, the rounded corner, the chamber, or the notch.

10. The display panel according to claim 9, wherein the resistance compensation unit is located on an end of the first signal line closer to the gate driver circuit.

11. The display panel according to claim 9, wherein two ends of the first signal line are both provided with the resistance compensation unit.

12. The display panel according to claim 1, wherein each of the groups of first pixels is connected respectively to corresponding one of the first signal lines, and the resistance compensation unit is located on an end of the first signal line away from the gate driver circuit.

13. The display panel according to claim 1, wherein the resistance compensation unit is located in the non-display region and arranged at a part of an edge of the indentation or the hollow section.

14. The display panel according to claim 13, wherein the resistance compensation unit is two layers of resistance wires connected in parallel.

15. The display panel according to claim 1, wherein the resistance compensation unit is located in the indentation or the hollow section.

16. The display panel according to claim 1, wherein the non-display region further comprises a fixed-potential line, and the resistance compensation unit is arranged at a different layer from the fixed-potential line, and overlaps with the fixed-potential line in the direction perpendicular to the display panel.

17. The display panel according to claim 1, wherein the display panel is an organic light-emitting display panel.

18. A display device, comprising:
a display panel, the display panel comprising: a display region, and a non-display region adjacent to the display region, wherein:
the display region comprises a first display region and a second display region, the first display region comprises a plurality of first pixels arranged in an array, the second display region comprises a plurality of second pixels arranged in an array, the number of pixels in any one row of the first pixels is less than the number of columns of the second pixels, each row of the first pixels of the first display region is parallel to each row of the second pixels of the second display region, and each column of the first pixels of the first display region is on an extension line of a line where a corresponding column of the second pixels of the second display region is located;
the display panel further comprises a gate driver circuit and a plurality of first signal lines, the gate driver circuit is arranged in the non-display region, each of the first signal lines is connected with the gate driver circuit, and at least one of the first signal lines provides a row of first pixels with a control signal; and
a resistance compensation unit is disposed on at least one of the first signal lines;
wherein an indentation or a hollow section is in the display region, the arrangement of the plurality of first pixels in the first display region in the row direction extends to the indentation or the hollow section, and each row of first pixels is separated by the indentation or the hollow section into several groups of first pixels;
wherein each row of first pixels is connected to corresponding one of the first signal lines, the first signal line is spaced by the indentation or the hollow section into several first sub-signal lines, and the resistance compensation unit is located between, and electrically connects, adjacent two of the first sub-signal lines.

19. The display panel according to claim 1, wherein resistance compensation units are disposed on the respective first signal lines, and at least two of the first signal lines correspond respectively to different numbers of the first pixels; and
the resistance of the resistance compensation unit on the first signal line on which a larger number of first pixels are connected is lower than the resistance of the resistance compensation unit on the first signal line on which a smaller number of first pixels are connected.

20. The display panel according to claim 19, wherein each row of first pixels corresponds to one of the first signal lines, the numbers of first pixels to which the plurality of first signal lines correspond respectively descend sequentially along the column direction, and the resistances of the resistance compensation units on the plurality of first signal lines ascend sequentially along the column direction; or the numbers of first pixels to which the plurality of first signal lines corresponds respectively ascend sequentially along the column direction, and the resistances of the resistance compensation units on the plurality of first signal lines descend sequentially along the column direction.

\* \* \* \* \*